United States Patent [19]

Murphy et al.

[11] 4,212,952
[45] Jul. 15, 1980

[54] N,N,N',N'-TETRAMETHYL-αω-POLYMETH-LENEDIAMINES AS CATALYSTS FOR THE PREPARATION OF URETHANE FOAMS

[75] Inventors: Gerald J. Murphy, Wappingers Falls; Bernard Kanner, West Nyack, both of N.Y.

[73] Assignee: Union Carbide Corporation, New York, N.Y.

[21] Appl. No.: 971,743

[22] Filed: Dec. 21, 1978

[51] Int. Cl.² .............................................. C08G 18/18
[52] U.S. Cl. ................................... 521/112; 521/127; 521/129
[58] Field of Search ................................ 521/129, 112

[56] References Cited
U.S. PATENT DOCUMENTS 4,033,911  7/1977  Sandner et al. ...................... 521/129

FOREIGN PATENT DOCUMENTS 1403569  8/1975  United Kingdom .

OTHER PUBLICATIONS

Kato, Chemical Abstract 70, 69085U 1969.
de Aquirre, Chemical Abstract 63, 9768a, 1965.

Primary Examiner—Maurice J. Welsh
Attorney, Agent, or Firm—Richard J. Gallagher

[57] ABSTRACT

A process for preparation of a urethane foam which comprises reacting an aromatic polyisocyanate with a polyol in the presence of a blowing agent and a catalytic amount of a compound of the formula $(CH_3)_2NCH_2CH_2(CH_2)_nCH_2CH_2N(CH_3)_2$ wherein n is 4, 3, 2, 1, or 0.

11 Claims, No Drawings

N,N,N',N'-TETRAMETHYL-αω-POLYMETHYLENEDIAMINES AS CATALYSTS FOR THE PREPARATION OF URETHANE FOAMS

BACKGROUND OF THE INVENTION

1. Field of the Invention

This invention relates to processes for the preparation of polyurethane foams.

2. Description of the Prior Art

Triethylenediamine (i.e. 1,4-diazabicyclo[2.2.2]octane is currently the tertiary amine gelation catalyst of choice in the commercial production of polyurethane foams from diisocyanates and polyols. Triethylenediamine is generally recognized throughout the urethane industry as a superior gelation catalyst. It is normally employed for urethane foam formulations as a 33 weight percent solution in dipropylene glycol. Prior to the present invention, two alternative urethane foam gelation catalysts were N,N,N',N'-tetramethyl-1,2-ethanediamine (TMEDA) and N,N,N',N'-tetramethyl-1,3-butanediamine (TMBDA). However, said alternatives to the triethylenediamine gelation catalysts have never received widespread acceptance in the industry because (1) they are not as active and (2) they impart an objectionable odor to the foams produced with them.

The present invention is founded on the unexpected discovery that N,N,N',N'-tetramethyl-α,ω-polymethylenediamines wherein the methylene chain consists of from 4–8 methylene moieties are approximately as effective gelation catalysts as a 33 weight percent solution of triethylenediamine in dipropylene glycol. Moreover, at least some of the catalysts of the present invention (e.g. N,N,N',N'-tetramethyl-1,6-hexanediamine) lack the degree of objectionable odor characteristics of the known tetramethylediamine catalysts TMEDA and TMBDA.

Several references, e.g. *Chem. Abstracts:* 70:69085u (Kato), 71: 39830m (Strassel et al.), 75: 118837e (Neet et al.), and 81: 121781m (Gemeinhardt et al.), refer to "tetramethylbutanediamine" or "tetramethylbutylenediamine" as catalysts in urethane production. However, investigation of these references revealed that the specific compound referred to is the N,N,N',N'-tetramethyl-1,3-butanediamine mentioned above, a commercially available catalyst (TMBDA): they did not disclose the use of the N,N,N',N'-tetramethyl-1,4-butanediamine which is claimed in this invention.

Two references which do refer to the use of amines of this invention as catalysts for an isocyanate reaction are: de Aquirre et al., *Chem. Abstracts,* 63:9768a (1965) and Seki et al., *Chem. Abstracts,* 85:193596k (1976). However, neither one of them demonstrates the use of the N,N,N',N'-tetramethyl-α,ω-polymethylenediamines of this invention, i.e. $(CH_3)_2NCH_2CH_2(CH_2)_nCH_2CH_2N(CH_3)_2$ wherein n is 0–4, in the preparation of urethane foams, or in the catalysis either of the alcohol-isocyanate or the water-isocyanate reactions which predominate in that process (see below, in the EXAMPLES). The de Aquirre et al. abstract relates to a general kinetic study conducted in dilute solution on the reaction of phenyl isocyanate with amines or ureas as catalyzed by a variety of tertiary amines including N,N,N',N'-tetramethyl-1,6-hexanediamine. The Seki et al. abstract describes the use of both N,N,N',N'-tetramethyl-1,6-hexanediamine and N,N,N',N'-tetramethyl-1,4-butanediamine as cocatalysts with dibutyltin dilaurate or stannous octoate for the preparation of epoxypolyisocyanate (referring, it is believed, to polyisocyanurate) foams.

Finally, British Pat. No. 1,403,569 contains a general allusion to the use of tertiary amines as catalysts for the reaction of polyisocyanates with polyalcohols to form polyurethanes. Among the tertiary amines contemplated by the British patent is N,N,N',N'-tetramethyl-1,6-hexanediamine. The British patent contains no disclosure relating to any foam preparation, much less any disclosure of the unexpected beneficial results which can be obtained according to the present invention.

SUMMARY OF THE INVENTION

The present invention relates to a process for the preparation of a urethane foam which comprises reacting an aromatic polyisocyanate with a polyol in the presence of a blowing agent and a catalyst of the formula $(CH_3)_2NCH_2CH_2(CH_2)_nCH_2CH_2N(CH_3)_2$ wherein n is an integer of from 0 to 4. It has been discovered that said amines catalyze the alcohol-isocyanate reaction in urethane foam formation to an unexpected degree.

DESCRIPTION OF THE PREFERRED EMBODIMENTS

Urethane foams are prepared by reacting an isocyanate component with a polyol component in the presence of catalyst, blowing agent, and, generally, surfactant.

Isocyanates which can be used in the process of this invention include such aromatic isocyanates as 2,4-tolylenediisocyanate, 2,6-tolylenediisocyanate, mixtures of the isomers, methylene-4,4'-diphenyldiisocyanate, isophoronediisocyanate, methylene-4,4'-dicyclohexyldiisocyanate, polymethylenepoly(phenyleneisocyanates) having the formula:

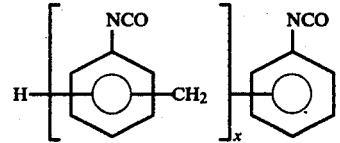

wherein x has an average value of from 1.1 to 6 inclusive (preferably from 2.0 to 3.0), and the like. The isocyanates are commonly used in an equivalent-weight excess relative to the polyols and other reactive-hydrogen compounds present in the reaction mixture.

When the foam to be prepared is flexible (i.e. a flexible polyether foam, a flexible polyester foam, or a high resilience foam), it is convenient to employ an isocyanate component which consists of tolylenediisocyanate: e.g. an 80:20 weight ratio of 2,4-tolylenediisocyanate-2,6-tolylenediisocyanate. When the foam to be prepared is rigid foam, it is convenient to utilize a polymeric isocyanate such as a polymethylenepoly(phenyleneisocyanate).

Polyols which can be used in the process of this invention include polyester polyols, polylactone polyols, poly(propylene glycol)diols and triols, poly(propylene glycol/ethylene glycol)diols and triols, polymer/polyols, sorbitol/polypropyleneoxy polyols, sorbitol/polypropyleneoxy/polyethyleneoxy polyols, polyamine/polypropyleneoxy polyols, phosphoric acid/polypropyleneoxy polyols, phenolic base polyols, brominated polyols, and the like. The polyether polyols and polymer/polyols are preferred. The weight of the polyol component is very often the reference point (e.g. 100 parts) in relative parts by weight urethane foaming formulations.

The polyols preferably possess a hydroxyl number of from about as low as 20 to about 70 for flexible foams and from about 70 to about 150 for semi-flexible foams. The polyols utilized in preparing rigid foams generally have hydroxyl numbers greater than 150.

The amines, the use of which as catalysts is the crux of this invention, may be represented by the general formula $(CH_3)_2NCHCH_2(CH_2)_nCH_2CH_2N(CH_3)_2$ wherein n is 4, 3, 2, 1, or 0. Only five compounds are catalysts according to this invention. They are:

N,N,N',N'-tetramethyl-1,4-butanediamine
N,N,N',N'-tetramethyl-1,5-pentanediamine
N,N,N',N'-tetramethyl-1,6-hexanediamine
N,N,N',N'-tetramethyl-1,7-heptanediamine
N,N,N',N'-tetramethyl-1,8-octanediamine The preparation of these compounds is well within the present skill of the art. Some of these compounds are available commercially. All can be made by a variety of synthetic techniques described in the literature. For example, N,N,N',N'-tetramethyl-1,6-hexanediamine has been synthesized by the reaction of 1,6-diidohexane with dimethylamine in highly dilute ethanol solution (von Braun, *Ber.*, 43, 2861—1910), by the lithium aluminum hydride reduction of ω-N,N-dimethylaminohexanoic acid dimethylamide or N,N,N',N'-tetramethyladipamide (Solovev et al., *Zh. Obshch. Khim.*, 33, 1821—1963), from cyclohexane by ozonolysis followed by reductive amination of the resultant ozonide with dimethylamine and hydrogen over Raney nickel at 100° C./600–1000 psig (White et al., *Tetrahedron Lett.*, 1971, 3591), and as described in the British patent mentioned above. Many other syntheses which can be used to prepare any member of the homologous series of this invention can easily be found in the chemical literature.

According to this invention, the amines described above can be utilized as catalysts alone, in diluents such as propylene glycol, dipropylene glycol, nonyl phenol, and the like, as blends with each other, and as blends with other amine catalysts such as N,N-dimethylethanolamine, 1,1,4,7,7-pentamethyldiethylenetriamine, N,N,N',N'-tetramethyl-1,3-butanediamine, N,N,N',N'-tetramethyl-1,2-ethylenediamine, triethylenediamine, quinuclidine, bis-(2-dimethylaminoethyl)ether, N,N-dimethylcyclohexylamine, higher boiling cuts from the manufacture of bis-(2-dimethylaminoethyl)ether or α,ω-N,N,N',N'-tetramethylalkanediamines, and the like.

The amines of this invention provide desired catalytic effects when utilized at from 0.01 to 10.0 parts by weight per 100.0 parts by weight of polyol (pphp). A preferred ranged is from 0.05 to 6.0 pphp, and the most preferred catalytically effective amounts are in the range of from 0.1 to 3.0 parts by weight of amine to 100.0 parts by weight of polyol. When used in blends with other catalysts, the amount of catalyst according to this invention utilized will generally be less than if it were used alone.

In addition to being used in blends with other catalysts as described above, the amine catalysts of this invention can also be employed in foaming reaction mixtures which separately utilize other amine and metal catalysts such as triethylenediamine, N-ethylmorpholine, N-methylmorpholine, bis-(2-dimethylaminoethyl)ether, triethylamine, N,N-dimethylethanolamine, N-(2-hydroxyethyl)piperazine, N,N-dimethylcyclohexylamine, N,N,N',N'',N'''-pentamethyldipropylenetriamine, N,N',N''''-tris-(3-dimethylaminopropyl)-s-hexahydrotriazine, quinuclidine, dibutyltin dilaurate, stannous octoate, nickel acetylacetonate, phenylmercuric propionate, and the like. Such other catalysts would be employed at 0.001 to 2.0 pphp, preferably from 0.01 to 0.50 pphp, and most preferably from 0.01 to 0.30 pphp.

A reaction mixture component essential to the production of a urethane foam is a blowing agent. Water is commonly used as a blowing agent. As such, it is generally utilized at up to 10 pphp, preferably from up to 7 pphp, and most preferably up to 5 pphp. Other blowing agents which may be employed either separately or in conjunction with water include such compounds as fluorotrichloromethane, 1,1,2-trichloro-1,2,2-trifluoroethene, methylene chloride, and the like.

The foaming reaction mixture can also contain a siloxane-polyoxyalkylene block copolymer surfactant foam stabilizer. Among the types which may be used are those of the formulae:

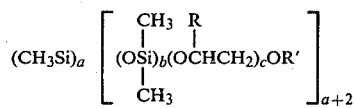

where a=zero or 1, b=3–10, c=20–80, R=CH₃ and/or H, and R'=C₁–C₄-alkyl, and

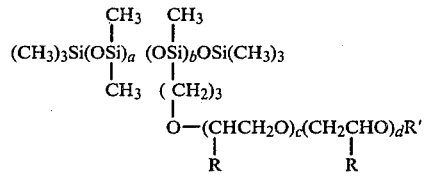

wherein a=20–28, b=3–15, c=0–80, d=0–80, R=CH₃ and/or H, and R'=C₁–C₄-alkyl and/or acetyl and/or H. Other types of surfactant may be selected from the patent literature on the stabilization of flexible, rigid, polyester, high resilience, or low combustibility polyurethane foam.

The more specific examples of this invention which follow are intended to illustrate the process of the present invention. They should not be construed as limiting the scope of the invention, which is set forth in the appended claims.

EXAMPLES

One of the important chemical reactions occuring in the course of the formation of a urethane foam is the alcohol-isocyanate reaction

In the commercial production of urethane foams, triethylenediamine is utilized to catalyze the alcohol-isocyanate reaction, the progress of which is measured experimentally as gel time. Triethylenediamine is generally recognized throughout the urethane industry as superior gelation catalyst, for which purpose it is generally employed as a 33% by weight solution in dipropylene glycol (D33LV ®). Therefore this product was chosen as a standard for acceptable catalyst performance in a rigid urethane foam system. A rigid foam test formulation which contained no water or auxillary catalysts was selected to evaluate catalytic activity, since these conditions would accentuate the gelation activity of a given amine. Although it is easier to analyze in the context of a rigid foam, the gelation activity of a catalyst is a significant factor in the production of flexible foams as well.

In order to be a true substitute for D33LV ®, a catalyst must show the same "reactivity profile" as D33LV ® in each of the categories of cream time, gel time, tack-free time, and rise time. The cream time is defined as the point where the first small bubbles of trapped gas are observed on the surface of the foaming mixture. This usually appears as a lightening in the color of the resinous material from dark brown to beige. As the foam is rising, a clean metal spatula is inserted into the foam and withdrawn. The spatula is then wiped clean and this process is repeated until fine strands of the forming polymer can be drawn out of the foam with the spatula. The time at which these threads of urethane first appear is called the gel or gelation time. After the gel time has been measured, the surface of the foam is touched lightly with a finger to determine when the surface is "tack-free". Initially the foam surface collapses when touched leaving a deposit of resinous polymer on the finger. The finger is wiped clean and the procedure is repeated until the foam may be touched without breaking the skin of the foam or leaving a residue on the finger. The time at which this occurs is referred to as the tack-free time. The rise times of these foams were determined by the movement of a slide wire which rests on a piece of aluminum foil on the surface of the foam. The rise time is called when the slide wire rises less than a millimeter in a 5 second interval.

Another important reaction occuring in the course of the formation of a urethane foam is the water-isocyanate reaction.

$$RNCO + H_2O \rightarrow [RNHCOOH] \rightarrow RNH_2 + CO_2 \uparrow$$

An accepted industry standard catalyst for the "blowing" reaction is a 70% by weight solution in propylene glycol of bis-[2-(N,N-dimethylamino)ethyl]ether, called hereinafter A-1. For a blowing catalyst, the most significant criterion is potency, i.e. the concentration of catalyst required to produce a certain rate of foam rise (rise time). Rise time characteristics were evaluated in high water flexible foam formulation.

FOAM PREPARATION METHODS

In the foam preparations that follow, all parts are parts by weight. The polyols and surfactants utilized were:

Polyol F: A polypropylene oxide—polyethylene oxide triol made from propylene oxide, ethylene oxide and glycerine and having a theoretical number average molecular weight of about 3600 and a hydroxyl number of about 46.7. Substantially all of the ethylene oxide units are disposed internally, i.e., substantially none of them form end units. Based on its total weight, the polyol contains about 14 wt.% $C_2H_4O$.

Polyol R: A polyoxyalkylene sucrose-amine polyol having a functionality of 5.4, constituted of a propylene oxide and ethylene oxide adduct made in a slurry of sugar in diethylenetriamine and aniline. Its theoretical number average molecular weight is about 750 and its hydroxyl number is about 400.

Surfactant F:

$$MeSi[(OSiMe_2)_{6.4}(OC_2H_4)_{22.3}(OC_3H_6)_{16.4}OC_4H_9]_3$$

Surfactant R:

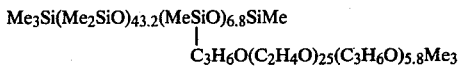

FLEXIBLE FOAM PREPARATION

A one-quart cardboard cup is charged with 100.0 parts of Polyol F and then 1.0 part of Surfactant F is blended into the polyol with a wooden tongue depressor. Then 4.0 parts of water and the desired concentration of amine are added as a premixed solution. A baffle is then insert into the cup and the mixture is blended, with a marine propellor attached to a drill press spinning at 2000 rpm, for a period of 15 seconds. Then 0.3 parts of stannous octoate catalyst is added via syringe, blended with the drill press for 7 seconds, and 48.3 parts of tolylene diisocyanate (80:20 mixture of the 2,4:2,6 isomers) is poured in rapidly, without interrupting the mixing. Stirring is continued for a total of 15 seconds, then stopped, and the formulation is poured into a 12" by 12" cardboard box. After the foaming reaction is completed, the foams are oven-cured for 10 minutes at 125° C. and allowed to cool to room temperature overnight before being cut.

RIGID FOAM PREPARATION

A one-quart cardboard cup is charged with a premix of 100.0 parts of Polyol R and 55.0 parts of monofluorotrichloromethane blowing agent. The amine catatlyst is added via syringe. The mixture is blended with a marine propellor attached to a drill press spinning at 2000 rpm for a period of 10 seconds. Without interrupting the mixing, a premix of 100.2 parts of a polymethylenepoly(phenylenisocyanate) (Upjohn's AFPI ®) and 2.0 parts of Surfactant R is rapidly added over a 4 second period. Stirring is continued for an additional 4 seconds, then stopped and the formulation is poured into a 8"×8"×6" cardboard box.

EXPERIMENTAL RESULTS

In order to demonstrate the relative reproducibility of the time measurements, 19 rigid control foams were prepared using 2.0 pphp of D33LV ®. The averages and their respective standard deviations are as follows: cream time, 25.3±3.8 seconds; gel time, 76.6±6.7 seconds; tack-free time, 102.6±5.3 seconds; rise time, 153±10.7 seconds.

The parameter which has the greatest influence on the variability of these values is temperature. Over a four month period of screening evaluations, laboratory temperature ranged from 18° C. to 25° C., depending on the season of the year and the weather conditions. Daily temperature variations were on the order of 1–1.5 C°. In order to allow comparison of rigid foam data obtained on different days, control experiments using 2.0 pphp D33LV ® were run at the start and finish of each set of amines which were being evaluated. The ratio of the experimental values for the control for any given day with the average of all the control runs were then used to "normalize" all the rigid data so that each of the amine candidates could be compared on an "average day" basis. A similar procedure was used to "normalize" the rise times reported for the flexible foams. However, A-1 rather than D33LV ® was employed as the normalizing control.

In the Tables which follow, the catalyst concentration is given in parts by weight per 100 parts by weight of polyol (pphp), the times are given in seconds, and the following abbreviations are used:

| | |
|---|---|
| D33LV® | A 33% by weight solution of triethylenediamine in dipropylene glycol. |
| A-1 | A 70% by weight solution of bis-[2-(N,N-dimethylamino)ethyl]-ether in dipropylene glycol. |
| TMEDA | N,N,N',N'-1,2-tetramethyl-1,2-ethylenediamine. |
| TMBDA | N,N,N',N'-tetramethyl-1,3-butanediamine. |
| 1,4-TMBDA | N,N,N',N'-tetramethyl-1,4-butanediamine. |
| 1,5-TMPDA | N,N,N',N'-tetramethyl-1,5-pentanediamine. |
| 1,6-TMHDA | N,N,N',N'-tetramethyl-1,6-hexanediamine. |
| 1,7-TMHDA | N,N,N',N'-tetramethyl-1,7-heptanediamine. |
| 1,8-TMODA | N,N,N',N'-tetramethyl-1,8-octanediamine. |

(even on an equal weight basis) of the catalysts of this invention as gelation catalysts to the known closely related catalysts N,N,N',N'-tetramethyl-1,2-ethylenediamine TMEDA) and N,N,N',N'-tetramethyl-1,3 butanediamine (TMBDA).

Table III indicates that the catalysts of this invention are, weight for weight, approximately equal as blowing catalysts to the closely related known catalysts TMEDA and TMBDA. Although this was to be expected for 1,4-TMBDA, it was somewhat unexpected for the higher molecular weight embodiments such as 1,6-TMHDA, since in the higher molecular embodiments, the contained nitrogen of a given weight of compound is less than in the same weight of a lower molecular weight embodiment.

Thus, although the catalysts according to the present invention might have been expected to be generally similar in effect to TMEDA and TMBDA, and they are rather similar in effect as blowing catalysts, they have been found to be unexpectedly superior as gelation catalysts. It appears, therefore, that unlike the previously known TMEDA and TMBDA catalysts, the catalysts according to this invention are suitable alternatives to triethylenediamine gelation catalysts commercially utilized in the production of urethane foams.

What is claimed is:

TABLE 1

COMPARATIVE EVALUATION IN RIGID FOAM FORMULATION
CATALYST CONCENTRATION: 1.0 pphp

| EXAMPLE NO. | | | | 1. | 2. | 3. | 4. | 5. |
|---|---|---|---|---|---|---|---|---|
| CATALYSTS | D33LV® | TMEDA | TMBDA | 1,4-TMBDA | 1,5-TMPDA | 1,6-TMHDA | 1,7-TMHDA | 1,8-TMODA |
| CREAM TIME | 41 | 41 | 40 | 40 | 37 | 39 | 40 | 43 |
| GEL TIME | 125 | 146 | 161 | 126 | 137 | 119 | 120 | 137 |
| TACK-FREE TIME | 195 | 246 | 210 | 191 | 175 | 204 | 203 | 209 |
| RISE TIME | 246 | 275 | 269 | 244 | 236 | 246 | 251 | 270 |

*(0.33 pphp triethylenediamine)

TABLE II

COMPARATIVE EVALUATION IN RIGID FOAM FORMULATION
CATALYST CONCENTRATION: 2.5 pphp

| EXAMPLE NO. | | | | 6. | 7. | 8. | 9. | 10. |
|---|---|---|---|---|---|---|---|---|
| CATALYSTS | D33LV® | TMEDA | TMBDA | 1,4-TMBDA | 1,5-TMPDA | 1,6-TMHDA | 1,7-TMHDA | 1,8-TMODA |
| CREAM TIME | 23 | 23 | 22 | 22 | 21 | 22 | 23 | 26 |
| GEL TIME | 62 | 72 | 82 | 63 | 71 | 66 | 65 | 75 |
| TACK-FREE | 81 | 97 | 96 | 84 | 79 | 86 | 92 | 98 |
| RISE TIME | 129 | 152 | 147 | 136 | 141 | 139 | 143 | 153 |

*(0.825 pphp triethylenediamine)

TABLE III

COMPARATIVE EVALUATION IN FLEXIBLE FOAM FORMULATION
CATALYSTS CONCENTRATION: 0.10 pphp*

| EXAMPLE NO. | CATALYSTS | RISE TIME |
|---|---|---|
| | A-1 | 80 |
| | TMEDA | 85 |
| | TMBDA | 82 |
| 11. | 1,4-TMBDA | 83 |
| 12. | 1,5-TMPDA | 85 |
| 13. | 1,6-TMHDA | 85 |
| 14. | 1,7-TMHDA | 86 |
| 15. | 1,8-TMODA | 89 |

*(0.07 pphp bis-[2-(N,N-dimethylamino)ethyl]ether)

EVALUATION

Tables I and II show the urethane foam catalyst reactivity profiles in terms of cream time, gel time, tack-free time, and rise time of the catalysts of this invention at two different concentration levels. Tables I and II demonstrate the clear and unexpected general superiority 1. In the process for the preparation of a urethane foam which comprises reacting an aromatic polyisocyanate with polyol in the presence of a catalyst and a blowing agent, the improvement which comprises conducting the reaction in the presence of a catalytic amount of an N,N,N40,N'-tetramethyl-$\alpha$,$\omega$-polymethylenediamine compound of the formula $(CH_3)_2NCH_2(CH_2)_nCH_2CH_2N(CH_3)_2$ wherein n is 4, 3, 2, 1, or 0.

2. The process of claim 1 wherein the N,N,N',N'-tetramethyl-$\alpha$,$\omega$-polymethylenediamine compound is present in an amount of from 0.1 to 3.0 parts by weight per 100.0 parts by weight of polyol.

3. A process of claim 1 wherein the urethane foam produced is a flexible foam.

4. A process of claim 3 wherein the aromatic polyisocyanate is tolylene diisocyanate and the polyol is a polyoxyalkylene polyol having a hydroxyl number of up to 70.

5. A process of claim 4 wherein there is present a tin gelation catalyst and a silicone surfactant.

6. A process of claim 5 wherein the N,N,N',N'-tetramethyl-α,ω-polymethylenediamine compound is present in an amount of from 0.1 to 3.0 parts by weight per 100.0 parts by weight of the polyoxyalkylene polyol.

7. A process of claim 1 wherein the urethane foam produced is a rigid foam.

8. A process of claim 7 wherein the aromatic polyisocyanate is a polymethylenepoly(phenyleneisocyanate) and the polyol is a polyoxyalkylene polyol having a hydroxyl number greater than 150.

9. A process of claim 8 wherein there is present a silicone surfactant.

10. A process of claim 9 wherein the N,N,N',N'-tetramethyl-α,ω-polymethylenediamine compound is present in an amount of from 0.1 to 3.0 parts by weight per 100.0 parts by weight of the polyoxyalkylene polyol.

11. A process according to any one of claims 1–10 wherein the N,N,N',N'-tetramethyl-α,ω-polymethylenediamine compound is N,N,N',N'-tetramethyl-1,6-hexanediamine.

* * * * *

UNITED STATES PATENT AND TRADEMARK OFFICE
CERTIFICATE OF CORRECTION

PATENT NO. : 4212952
DATED : July 15, 1980
INVENTOR(S) : Murphy et al.

It is certified that error appears in the above—identified patent and that said Letters Patent is hereby corrected as shown below:

Column 6, line 5, for the top line of the formula for Surfactant R, read $$\text{--Me}_3\text{Si}(\text{Me}_2\text{SiO})_{43.2}(\text{MeSiO})_{6.8}\text{SiMe}_3\text{--}$$

Claim 1, sixth line, for "N,N,N40 , N'" read --N,N,N',N'--

Signed and Sealed this

Eleventh Day of November 1980

[SEAL]

Attest:

SIDNEY A. DIAMOND

Attesting Officer    Commissioner of Patents and Trademarks

UNITED STATES PATENT AND TRADEMARK OFFICE
CERTIFICATE OF CORRECTION

PATENT NO. : 4212952
DATED : 7-15-80
INVENTOR(S) : Gerald J. Murphy
Bernard Kanner It is certified that error appears in the above-identified patent and that said Letters Patent are hereby corrected as shown below:

In the title, for "POLYMETHLENEDIAMINES" read
-- POLYMETHYLENEDIAMINES --.

Column 1, line 36, for "tetramethylediamine" read
-- tetramethylenediamine --.

Column 3, line 12, for
"$(CH_3)_2NCHCH_2(CH_2)_nCH_2CH_2N(CH_3)_2$" read
-- $(CH_3)_2NCH_2CH_2(CH_2)_nCH_2CH_2N(CH_3)_2$ --.

Column 7, line 14, for "N,N,N'N'-1,2-tetramethyl-1,2-"
read -- N,N,N',N'-tetramethyl-1,2- --.

Claim 1, penultimate line, for
"$(CH_3)_2NCH_2(CH_2)_nCH_2CH_2N(CH_3)_2$" read
-- $(CH_3)_2NCH_2CH_2(CH_2)_nCH_2CH_2N(CH_3)_2$ --.

Signed and Sealed this

Twenty-seventh Day of January 1981

[SEAL]

Attest:

RENE D. TEGTMEYER

Attesting Officer

Acting Commissioner of Patents and Trademarks

Disclaimer 4,212,952.—*Gerald J. Murphy*, Wappingers Falls; and *Bernard Kanner*, West Nyack, N.Y. N,N,N',N'-TETRAMETHYL-α,ω-POLYMETHYLENEDIAMINES AS CATALYSTS FOR THE PREPARATION OF URETHANE FOAMS. Patent dated July 15, 1980. Disclaimer filed Mar. 31, 1982, by the assignee, *Union Carbide Corp.*

Hereby enters this disclaimer to claims 1 through 11 of said patent.

[*Official Gazette May 25, 1982.*]